United States Patent
Povinelli et al.

(10) Patent No.: US 9,272,614 B1
(45) Date of Patent: Mar. 1, 2016

(54) VARIABLE OR STEPPED LOUVER ACTIVATION FOR ACTIVE GRILLE SYSTEM

(71) Applicant: MAGNA INTERNATIONAL INC., Aurora (CA)

(72) Inventors: Anthony J. Povinelli, Romeo, MI (US); Thomas E. Cobb, Savannah, GA (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 14/860,758

(22) Filed: Sep. 22, 2015

Related U.S. Application Data

(63) Continuation of application No. 14/114,970, filed as application No. PCT/US2012/037505 on May 11, 2012, now Pat. No. 9,168,827.

(60) Provisional application No. 61/518,893, filed on May 13, 2011.

(51) Int. Cl.
  *B60K 11/08* (2006.01)
  *B60K 11/06* (2006.01)

(52) U.S. Cl.
  CPC .............. *B60K 11/085* (2013.01); *B60K 11/06* (2013.01)

(58) Field of Classification Search
  CPC ...... B60K 11/08; B60K 11/085; B60R 19/12; B60R 2019/486; F01P 7/10
  See application file for complete search history.

(56) References Cited

U.S. PATENT DOCUMENTS

| | | | |
|---|---|---|---|
| 1,737,946 A | 12/1929 | Rood | |
| 5,141,026 A * | 8/1992 | Collette | B60K 11/085 137/601.09 |
| 5,738,179 A * | 4/1998 | Matsui | B62D 25/10 16/357 |
| 7,757,643 B2 | 7/2010 | Harich et al. | |
| 8,316,974 B2 * | 11/2012 | Coel | B60K 11/085 165/44 |
| 8,463,493 B2 * | 6/2013 | Lockwood | F01P 7/10 180/68.1 |
| 8,561,738 B2 * | 10/2013 | Charnesky | B60K 11/085 180/68.1 |
| 8,561,739 B2 | 10/2013 | Hori | |
| 8,646,552 B2 * | 2/2014 | Evans | B60K 11/085 180/68.1 |
| 8,714,290 B2 * | 5/2014 | Kitashiba | B60K 11/085 165/41 |
| 8,727,054 B2 * | 5/2014 | Hori | B60K 11/085 165/41 |
| 8,739,744 B2 * | 6/2014 | Charnesky | B60K 11/085 123/41.04 |
| 8,752,886 B2 * | 6/2014 | Wirth | B60K 11/085 180/68.6 |
| 8,794,362 B2 * | 8/2014 | Lee | B60K 11/085 180/68.1 |
| 8,915,320 B2 * | 12/2014 | Chinta | B60K 11/08 180/68.1 |

(Continued)

FOREIGN PATENT DOCUMENTS

| | | |
|---|---|---|
| DE | 10 2008 061054 | 6/2010 |
| DE | 10 2009 052372 | 5/2011 |
| EP | 2 233 343 | 9/2010 |

*Primary Examiner* — Brodie Follman
(74) *Attorney, Agent, or Firm* — Warn Partners, P.C.

(57) ABSTRACT

An active grille system which is mounted to a fascia, grille, or carrier, or is part of the carrier of an automobile. Two sets of louvers are rotatably mounted to a frame, and a camming mechanism provides selective actuation of both sets of louvers, and an actuator controls the camming mechanism such that the actuator moves the camming mechanism between a first position, a second position, and a third position. When the camming mechanism is in the first position, both the first set and second set of louvers are in a closed position, when the camming mechanism is in the second position, the first set of louvers are in an open position and the second set of louvers are in a closed position, and when the camming mechanism is in the third position both the first set and second set of louvers are in an open position.

17 Claims, 4 Drawing Sheets

(56) References Cited

U.S. PATENT DOCUMENTS

| | | |
|---|---|---|
| 2007/0169725 A1 | 7/2007 | Harich et al. |
| 2010/0147611 A1* | 6/2010 | Amano ............... B60K 11/085 180/68.1 |
| 2010/0243352 A1* | 9/2010 | Watanabe ............ B60K 11/085 180/68.1 |
| 2011/0048691 A1* | 3/2011 | Shin ..................... F01P 7/12 165/299 |
| 2011/0226541 A1 | 9/2011 | Hori et al. |
| 2011/0281515 A1* | 11/2011 | Lockwood ............ F01P 7/12 454/75 |
| 2011/0288717 A1* | 11/2011 | Yu ....................... B60K 11/085 701/31.4 |
| 2011/0297468 A1 | 12/2011 | Coel et al. |
| 2011/0308763 A1 | 12/2011 | Charnesky et al. |
| 2012/0019025 A1 | 1/2012 | Evans et al. |
| 2012/0060776 A1 | 3/2012 | Charnesky et al. |
| 2012/0132474 A1 | 5/2012 | Charnesky et al. |
| 2013/0025952 A1 | 1/2013 | Kitashiba et al. |
| 2013/0146375 A1 | 6/2013 | Lee |
| 2013/0264047 A1* | 10/2013 | Charnesky ........... B60K 11/085 165/287 |
| 2014/0076646 A1* | 3/2014 | Povinelli .............. B60K 11/085 180/68.1 |

* cited by examiner

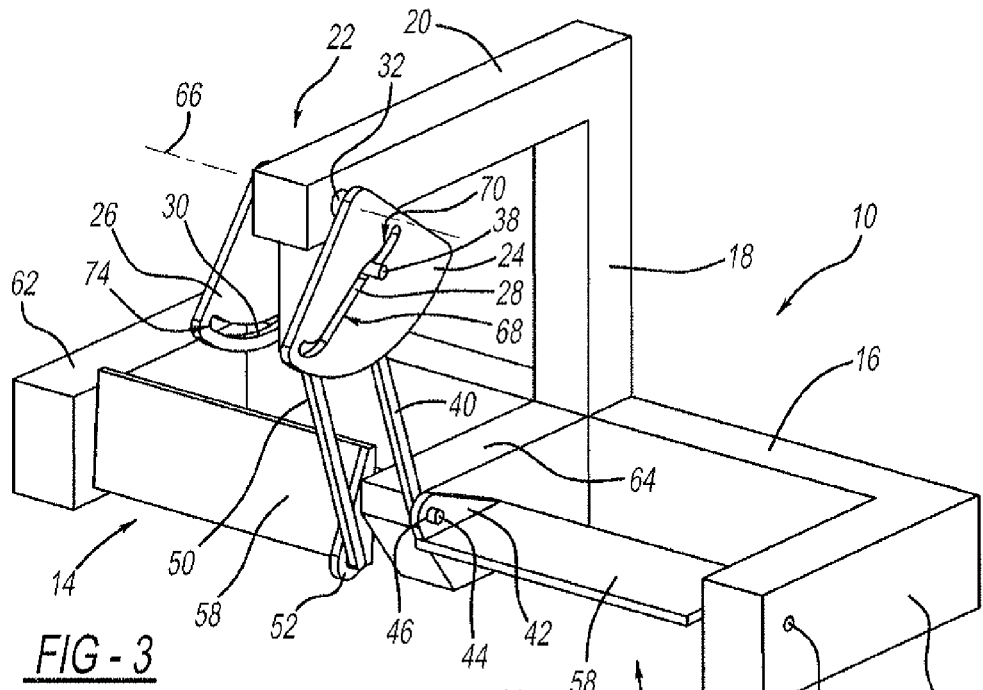
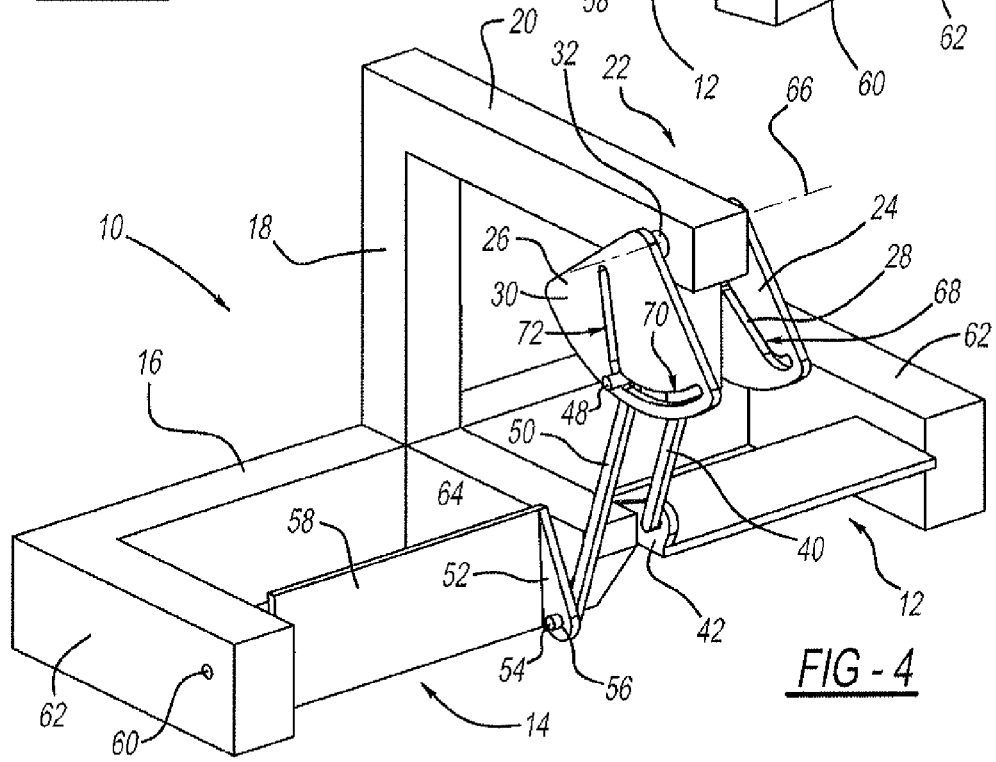

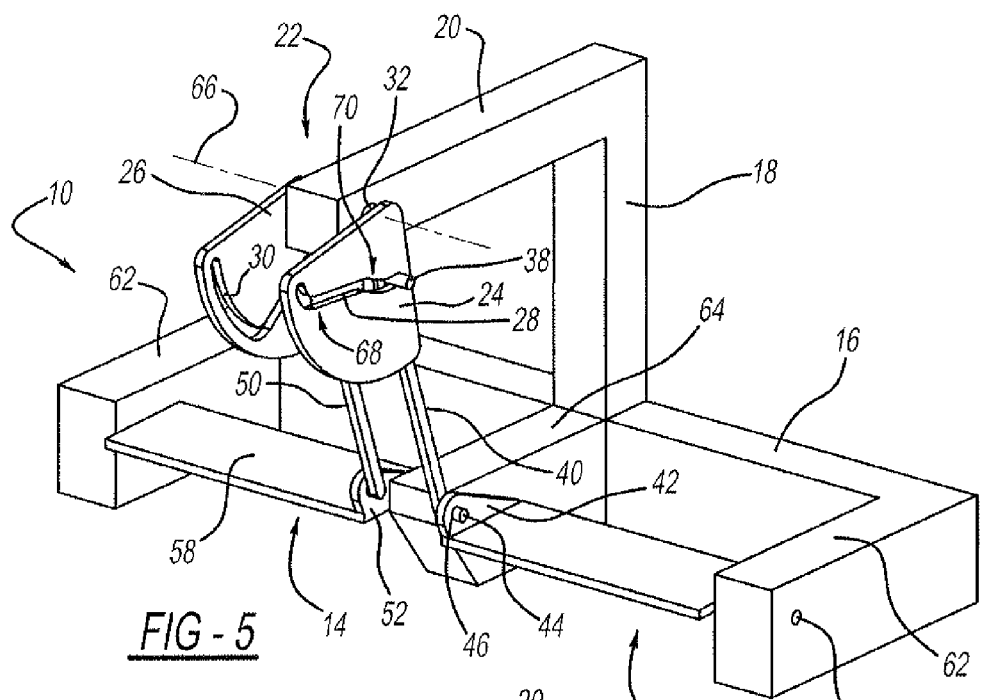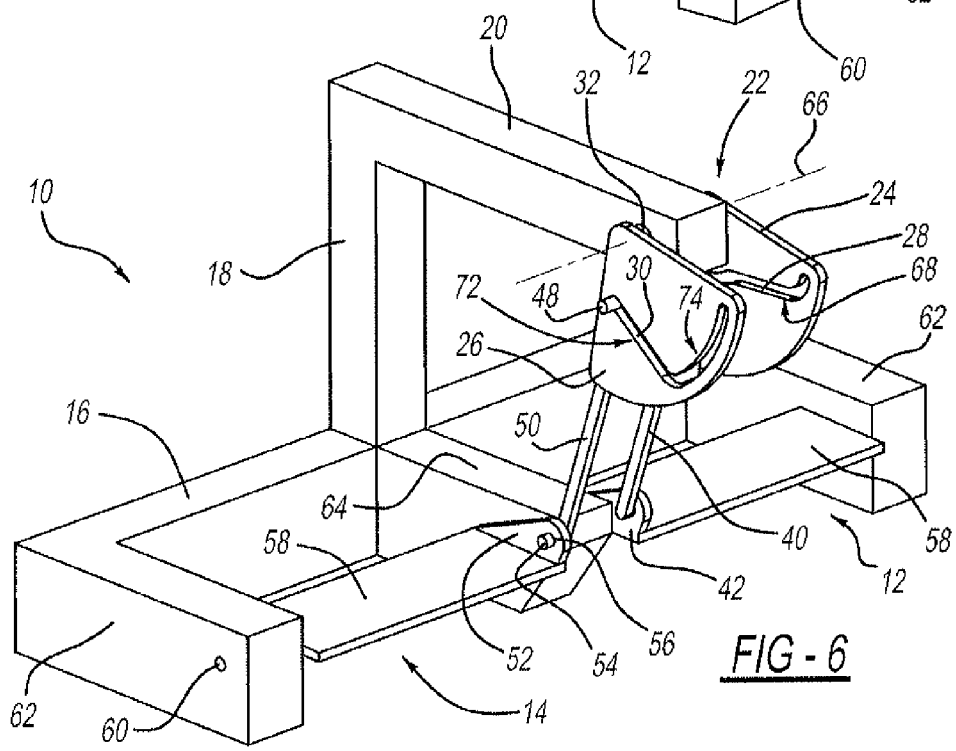

VARIABLE OR STEPPED LOUVER ACTIVATION FOR ACTIVE GRILLE SYSTEM

CROSS-REFERENCE TO RELATED APPLICATIONS

This application is a continuation of U.S. patent application Ser. No. 14/114,970, filed Oct. 31, 2013, which is a national stage application of PCT/US2012/037505, filed May 11, 2012, which claims priority to U.S. Provisional Application No. 61/518,893 filed May 13, 2011. The entire disclosures of the above applications are incorporated herein by reference.

FIELD OF THE INVENTION

The present invention relates to an active grille system having a single actuator for controlling the movement of two sets of louvers which are part of the grille.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Also, with many current cooling systems, the airflow generated from the forward motion of a vehicle is not efficiently used to cool the various components of the vehicle. Rather, many of the components of a vehicle cause poor airflow which leads to aerodynamic inefficiencies.

Accordingly, there exists a need for a cooling system which is operable to have greater control over the airflow around an engine which is adaptable to be suited for use with many different vehicles, and utilizes a minimal amount of parts and actuators for controlling the cooling system.

SUMMARY OF THE INVENTION

The present invention is an active grille system having a frame which is mounted to an existing vehicle component (carrier, fascia, grille, etc.,) or is part of the carrier of an automobile. A first set of louvers are rotatably mounted to the frame, and a second set of louvers are also rotatably mounted to the frame at a different location relative to the first set of louvers. The present invention also includes a camming mechanism for providing selective actuation of the first set of louvers and the second set of louvers, and an actuator which controls the camming mechanism such that the actuator moves the camming mechanism between a first position, a second position, and a third position.

When the camming mechanism is in the first position, the first set of louvers and the second set of louvers are in a closed position; when the camming mechanism is in the second position, the first set of louvers are in an open position and the second set of louvers are in a closed position; and when the camming mechanism is in the third position, the first set of louvers and the second set of louvers are in an open position.

The camming mechanism includes a first camming plate and a second camming plate driven by the actuator and rotates in unison. Each camming plate has a slot that is shaped differently relative to each other. There is a first link connected to the first set of louvers which has a pin that extends into the slot of the first camming plate to move the first set of louvers, and there is a second link connected to the second set of louvers which has a pin that extends into the slot of the second camming plate for moving the second set of louvers. As the camming plates rotate between the first position, the second position, and the third position, the pin connected to the first link moves in the slot of the first camming plate to control the actuation of the first set of louvers between open and closed positions, and the pin connected to the second link moves in the slot of the second camming plate to control the actuation of the second set of louvers between open and closed positions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a first perspective view of an active grille system having two sets of louvers, with one set of louvers being in the closed position, and another set of louvers being in the open position, according to the present invention;

FIG. 4 is a second perspective view of an active grille system having two sets of louvers, with one set of louvers being in the closed position, and another set of louvers being in the open position, according to the present invention;

FIG. 5 is a first perspective view of an active grille system having two sets of louvers, with both sets of louvers being in the open position, according to the present invention;

FIG. 6 is a second perspective view of an active grille system having two sets of louvers, with both sets of louvers being in the open position, according to the present invention.

DETAILED DESCRIPTION OF THE PREFERRED EMBODIMENTS

Figure 1:
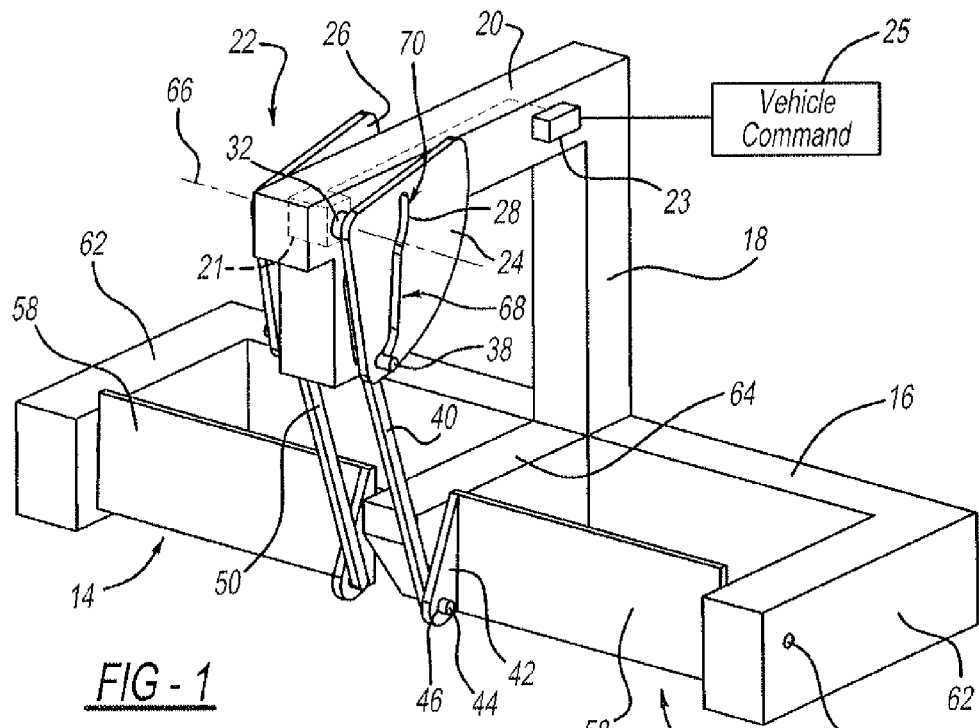
FIG. 1 is a first perspective view of an active grille system having two sets of louvers, with both sets of louvers being in the closed position, according to the present invention.

The following description of the preferred embodiment(s) is merely exemplary in nature and is in no way intended to limit the invention, its application, or uses.

Referring to the Figures generally, an active grille system having variable actuation is shown in the Figures generally at 10. The system 10 is suitable for a vehicle having a cooling system, and includes a first set of louvers, generally shown at 12, and a second set of louvers, generally shown at 14. While only one of the first set of louvers 12 and only one of the second set of louvers 14 is shown in the Figures, it is contemplated that there is multiple louvers which make up the first set of louvers 12 and the second set of louvers 14. Each of the sets of louvers 12, 14 are mounted to a frame 16, and the frame 16 includes a post portion 18 and an overhang 20. The frame 16 may be part of the carrier of a vehicle, and mounted in front of a cooling device such as a radiator, or on a fascia or grille.

Mounted to the overhang 20 is an actuator 21, and mounted to the actuator 21 is a cam mechanism, shown generally at 22. The cam mechanism 22 includes a first camming plate 24 and a second camming plate 26. The first camming plate 24 has a first slot 28, and the second camming plate 26 has a second slot 30. The camming plates 24, 26 rotate in unison by way of a shaft 32 which extends through the overhang 20. The shaft 32 is connected to the actuator which is inside the overhang or mounted to the overhang. It is also within the scope of this invention for the actuator to be at a location distant from the frame 16 with a drive system connected to the shaft 32 or cam plates 24, 26.

Extending into the first slot 28 is a first pin 38 which is connected to a first link 40, and the first link 40 is pivotally connected to a first flange 42 formed as part of one of the first set of louvers 12. The first link 40 may be pivotally connected to the first flange 42 by a second pin 44 extending through an aperture 46 formed as part of the first flange 42, or by any other suitable method which would provide a pivot relationship between the first link 40 and the first flange 42.

Extending into the second slot 30 is a third pin 48 which is connected to a second link 50, and the second link 50 is pivotally connected to a second flange 52 formed as part of one of the second set of louvers 14. The second link may be pivotally connected to the second flange 52 by a fourth pin 54 extending through an aperture 56 formed as part of the second flange 52, or by any other suitable method which would provide a pivot relationship between the second link 50 and the second flange 52.

The louvers 12, 14 are mounted to the frame 16 such that the louvers 12, 14 are able to pivot relative to the frame 16. Each louver 12, 14 is of generally the same construction, and includes a body portion 58, and a projection extends from each side of the body portion 58; one of the projections extends into an aperture 60 formed as part of an outer support 62, and another of the projections extends into an aperture formed as part of a central support 64.

The first slot 28 is shaped differently compared to the second slot 30, and each slot 28, 30 defines the path of movement of the pins 38, 48 in the respective slots 28, 30. The slots 28, 30 are shaped to move the pins 38, 48, and therefore the links 40, 50 and the louvers 12, 14, separately. The camming plates 24,26 rotate about an axis 66 about ninety degrees between three different positions, a first position shown in FIGS. 1 and 2, a second position shown in FIGS. 3 and 4, and a third position shown in FIGS. 5 and 6. The cam plates 24, 26 rotate ninety degrees relative to the axis 66. It is within the scope of the invention for the rotation angle 67 to be 90, 45, 180, 360, 720, 10, 20, 30, 40, 50, 60, 70 and 80 degrees depending on the need of a particular application. In the second position, the camming plates 24, 26 are rotated forty-five degrees or about forty-five degrees, and in the third position, the camming plates 24, 26 are rotated ninety degrees or about ninety-degrees.

Figure 2:
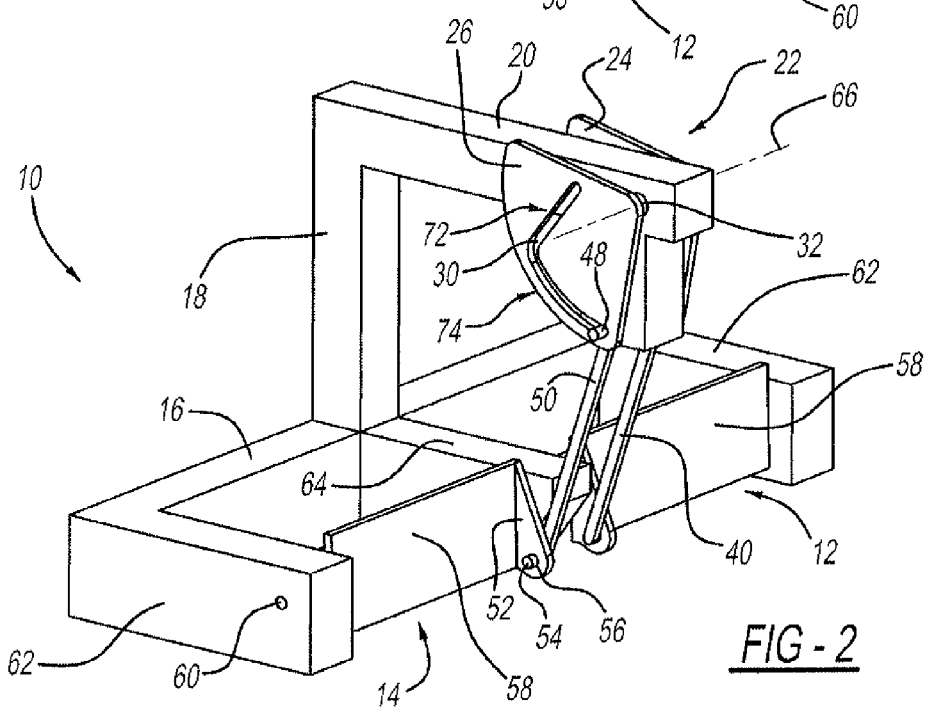
FIG. 2 is a second perspective view of an active grille system having two sets of louvers, with both sets of louvers being in the closed position, according to the present invention.

When the camming plates 24, 26 are in the first position, both sets of louvers 12, 14 are in the closed position, as shown in FIGS. 1 and 2. When the vehicle reaches a first predetermined temperature, the actuator connected to the shaft 32 rotates the shaft 32, and rotates the camming plates 24, 26 from the first position to the second position shown in FIGS. 3 and 4. In this embodiment, the actuator is a stepper motor which is controlled by the vehicle's electronic control unit (ECU), which correlates the operation of the stepper motor to the entire cooling system of the vehicle. It is also within the scope of the invention for the actuator to be controlled by a controller 23 independent from the ECU, where the controller is mounted on the frame 16 and is connected to a vehicle command 25 configured to provide inputs relating to vehicle parameters. The vehicle parameters generally speaking are any parameters or conditions which would require adjustment of air flow though the active grille system 10. Examples of vehicle parameters include but are not limited to air temperature, coolant temperature, air conditioner on/off, fan on/off, vehicle speed etc.

The slots 28, 30 are shaped such that during this part of the rotation of the camming plates 24, 26 the second set of louvers 14 remain closed, and the first set of louvers 12 are moved to an open position best shown in FIGS. 3 and 4. Upon further rotation of the shaft 32 and the camming plates 24, 26 to the third position shown in FIGS. 5 and 6 when the vehicle reaches a second predetermined temperature, the first set of louvers 12 remain in the open position, and the second set of louvers 14 move from the closed position to the open position.

Figure 7:
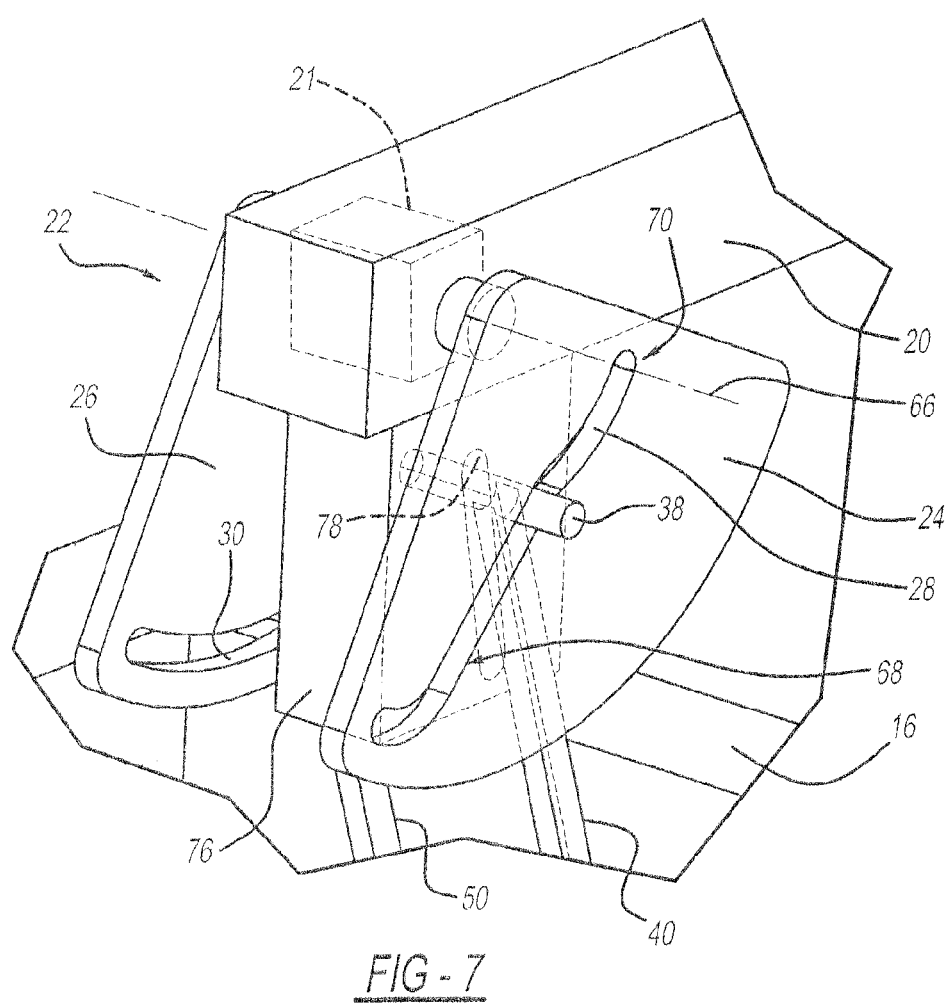
FIG. 7 is an enlarged perspective view of a camming mechanism used as part of an active grille system having two sets of louvers, according to the present invention.

The difference in movement of the first set of louvers 12 and the second set of louvers 14 is the result of the shape of the slots 28, 30 being different. Each of the slots 28, 30 has an active portion, and an idle portion. More specifically, the first slot 28 has a first active portion, shown generally at 68, and a first idle portion shown generally at 70, and the second slot 30 has a second active portion, shown generally at 72, and a second idle portion, shown generally at 74. Extending downward from the overhang 20 is a projection 76 having a guide slot 78, best seen in FIG. 7. A portion of the first pin 38 and a portion of the third pin 48 extend into the guide slot 78 for controlling the movement of the links 40, 50. Although both the first pin 38 and the third pin 48 extend into the guide slot 78, the first pin 38 and third pin 48 are not connected together, which allows independent movement of the links 40, 50, and also ensures that when the camming plates 24, 26 rotate, the pins 38, 48 move in the respective slots 28, 30, instead of moving with the camming plates 24, 26.

As the camming plates 24,26 move from the first position to the second position, the first pin 38 moves through the guide slot 78 and the first active portion 68 of the first slot 28, and the third pin 48 moves through the second idle portion 74 of the second slot 30. As the first pin 38 moves through the guide slot 78 and the active portion 68 of the first slot 28, the first slot 28 is shaped such that the pin 38, first link 40, first flange 42 move and cause the first louver 12 move to the open position. As the third pin 48 moves through the idle portion 74 of the second slot 30, the third pin 48, the second link 50, the second flange 52, do not move, and the second louver 14 remains in the closed position.

As the camming plates 24,26 move from the second position to the third position, best shown in FIGS. 5 and 6, the first pin 38 moves through the idle portion 70 of the first slot 28, and the third pin 48 moves through the guide slot 78 and the active portion 72 of the second slot 30. As the first pin 38 moves through the idle portion 70 of the first slot 28, the idle portion 70 is shaped such that the pin 38, first link 40, first flange 42, and first louver 12 do not move, and the first louver 12 remains in the open position. As the third pin 48 moves through the guide slot 78 and the active portion 72 of the second slot 30, the active portion 72 is shaped such that the third pin 48, the second link 50, the second flange 52, move and the second louver 14 is moved to the open position, shown in FIGS. 5 and 6.

While is has been shown and described that the camming plates 24, 26 are movable between the first position, the second position, and the third position, it is within the scope of the invention that the camming plates 24, 26 are movable to any position between the first position and the third position to open the louvers 12, 14 to intermediate positions between their respective open and closed positions. The vehicle for which the system 10 of the present invention is being used may require various positioning of the louvers 12, 14 to maintain a proper operating temperature under different driving conditions. The active grille system 10 of the present invention achieves the opening and closing of two different sets of louvers 12, 14 while using only a single actuator. While the two louvers 12, 14 are shown in the Figures as being adjacent one another, it is within the scope of the invention that the frame 16 may be shaped such that the first set of louvers 12 may be positioned above the second set of louvers 14.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An active grille system, comprising:
a frame;
a first set of at least one louver rotatably mounted to said frame;
a second set of at least one louver rotatably mounted to said frame;
a camming mechanism including a first camming plate rotatably mounted to a shaft and second camming plate rotatably mounted to the shaft for providing selective actuation of said first set of at least one louver and said second set of at least one louver, wherein said camming mechanism is rotatable between a first position, a second position, and a third position;
wherein said first position, said second position and said third position rotate said first set of at least one louver and said second set of at least one louver to an opened position, closed position and intermediate position, each corresponding to said first position, said second position and said third position;
a first link pivotally connected to said first set of at least one louver,
a second link pivotally connected to said second set of at least one louver;
a first slot formed on the first camming plate and a second slot formed on the second camming plate, where the first slot is shaped different from the second slot; and
a pin of the first link received in the first slot and a pin of the second link received in the second slot, where in the first slot and the second slot are shaped to move the respective one of the pin of the first link and the pain of the second link separately.

2. The active grille system of claim 1, wherein as said first camming plate is moved between said first position, said second position, and said third position, said first camming plate moves said first link and said first set of at least one louver between said open position and said closed position, and as said second camming plate is moved between said first position, said second position, and said third position, said second camming plate moves said second link and said second set of at least one louver between said open position and said closed position.

3. The active grille system of claim 1, said first camming plate further comprising:
a first active portion formed as part of said first slot, and said pin connected to said first link moves in said first active portion of said first slot as said camming mechanism moves from said first position to said second position; and
a first idle portion formed as part of said first slot, and said pin connected to said first link moves in said first idle portion of said first slot as said camming mechanism moves from said second position to said third position.

4. The active grille system of claim 1, said second camming plate further comprising:
a second idle portion formed as part of said second slot, said pin connected to said second link moves in said second idle portion of said second slot as said camming mechanism moves from said first position to said second position; and
a second active portion formed as part of said second slot, and said pin connected to said second link moves in said second active portion of said second slot as said camming mechanism moves from said second position to said third position.

5. The active grille system of claim 1 further comprising:
a guide slot formed on said frame, wherein said first link and said second link are connected to said guide slot.

6. The active grille system of claim 1 further comprising an actuator connected to said frame and configured to rotate said camming mechanism between said first position, said second position, and said third position.

7. The active grille system of claim 6 further comprising a controller connected to said actuator and a vehicle command connected to said controller for providing engine temperature readings to said controller, wherein said controller determines whether said actuator rotates said cam between said first position, said second position and said third position depending upon the temperature reading from said vehicle command.

8. An active grille system, comprising:
a frame;
a first set of at least one louver rotatably mounted to said frame;
a second set of at least one louver rotatably mounted to said frame;
a camming mechanism for including a first camming plate rotatably mounted to a shaft and second camming plate rotatably mounted to the shaft providing selective actuation of said first set of at least one louver and said second set of at least one louver; and
an actuator connected to the shaft which controls said camming mechanism such that said actuator moves said camming mechanism between a first position, a second position, and a third position;
wherein said first set of at least one louver and said second set of at least one louver are in a closed position when said camming mechanism is in said first position, said first set of at least one louver is in an open position and said second set of at least one louver is in a closed position when said camming mechanism is in said second position, and said first set of at least one louver and said second set of at least one louver are in an open position when said camming mechanism is in said third position;

a first link pivotally connected to the first louver;
a second link pivotally connected to the second louver;
a first slot formed on the first camming plate and a second slot formed on the second camming plate, where the first slot is shaped different from the second slot; and
a pin of the first link received in the first slot and a pin of the second link received in the second slot, where in the first slot and the second slot are shaped to move the respective one of the pin of the first link and the pain of the second link separately.

9. The active grille system of claim 8, wherein as said first camming plate is moved between said first position, said second position, and said third position, said first camming plate moves said first link and said first set of at least one louver between said open position and said closed position, and as said second camming plate is moved between said first position, said second position, and said third position, said second camming plate moves said second link and said second set of at least one louver between said open position and said closed position.

10. The active grille system of claim 8, said first camming plate further comprising:
a first active portion formed as part of said first slot, and said pin connected to said first fink moves in said first active portion of said first slot as said camming mechanism moves from said first position to said second position; and
a first idle portion formed as part of said first slot, and said pin connected to said first link moves in said first idle portion of said first slot as said camming mechanism moves from said second position to said third position.

11. The active grille system of claim 8, said second camming plate further comprising:
a second idle portion formed as part of said second slot, said pin connected to said second link moves in said second idle portion of said second slot as said camming mechanism moves from said first position to said second position; and
a second active portion formed as part of said second slot, and said pin connected to said second link moves in said second active portion of said second slot as said camming mechanism moves from said second position to said third position.

12. The active grille system of claim 8 further comprising:
a guide slot formed on said frame, wherein said first link and said second link are connected to said guide slot.

13. An active grille system comprising:
a frame;
a first set of at least one louver rotatably mounted to said frame;
a second set of at least one louver rotatably mounted to said frame;
a camming mechanism including a first camming plate rotatably mounted to a shaft connected to said frame;
wherein said camming mechanism further includes a second camming plate rotatably mounted to the shaft such that said first camming plate and said second camming plate rotate substantially in unison;
an actuator which controls the rotation of said first camming plate and said second camming plate such that said actuator moves said first camming plate and said second camming plate between a first position, a second position and a third position;
a first link connecting said first set of at least one louver to said first camming plate;
a second link connecting said second set of at least one louver to said second camming plate;
a first slot formed on the first camming plate and a second slot formed on the second camming plate, where the first slot is shaped different from the second slot; and
a pin of the first link received in the first slot and a pin of the second link received in the second slot, where in the first slot and the second slot are shaped to move the respective one of the pin of the first link and the pain of the second link separately;
a first active portion formed as part of said first slot, and said pin of said first link moves in said first active portion as said camming mechanism is rotated from said first position to said second position;
a first idle portion formed as part of said first slot, and said pin connected to said first link moves in said first idle portion of said first slot when said first camming plate moves from said second position to said third position;
a second active portion formed as part of said second slot, and said pin of said first link moves in said second active portion as said camming mechanism is rotated from said first position to said second position;
a second idle portion formed as part of said second slot, and said pin connected to said first link moves in said second idle portion of said first slot when said first camming plate moves from said second position to said third position; and
wherein said first set of at least one louver and said second set of at least one louver are in a closed position when said first camming plate and second camming plate are in said second position.

14. The active grille system of claim 13 wherein first set of at least one louver and said second set of at least one louver are in an open position when said camming mechanism is in said third position.

15. The active grille system of claim 13 further comprising:
a first flange formed on each one of said at least one louver of said first set and said at least one louver of said second set;
an aperture formed at said first flange for rotatably connecting said at least one louver to said first link or said second link.

16. The active grille system of claim 13 further comprising:
a body portion of said frame;
a first aperture formed in said body portion for rotatably receiving a portion of said at least one louver of said first set, wherein said first aperture rotatably mounts said at least one louver of said first set to said body portion;
a second aperture of said body portion for rotatably receiving a portion of said at least one louver of said second set for rotatably connecting said at least one louver to said first link or said second link.

17. The active grille system of claim 13 further comprising:
a guide slot formed on said frame, wherein said first link and said second link are connected to said guide slot.

* * * * *